July 26, 1938.  J. P. KIVLEN ET AL  2,125,028
FULL FLOATING HUB LINER
Filed June 12, 1936  2 Sheets-Sheet 1
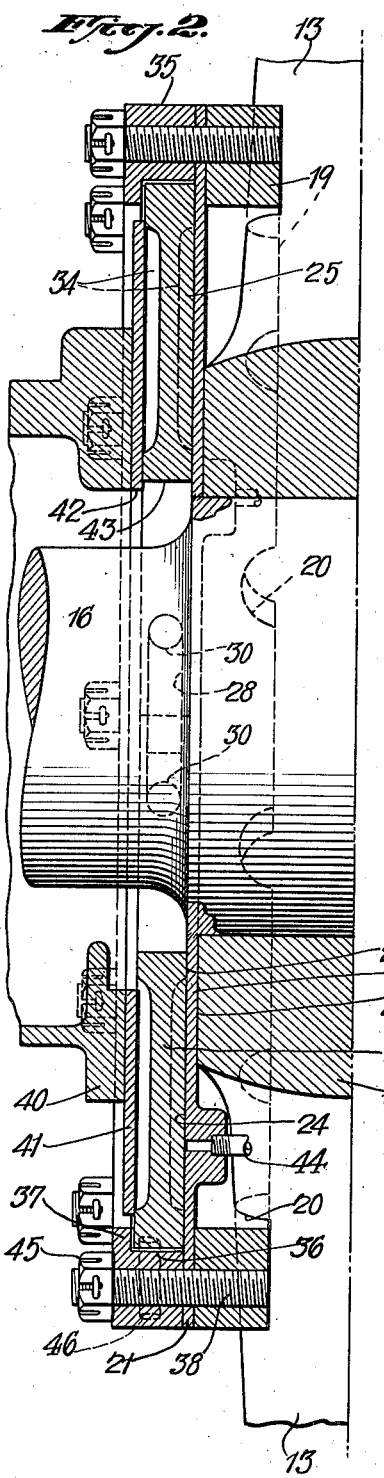
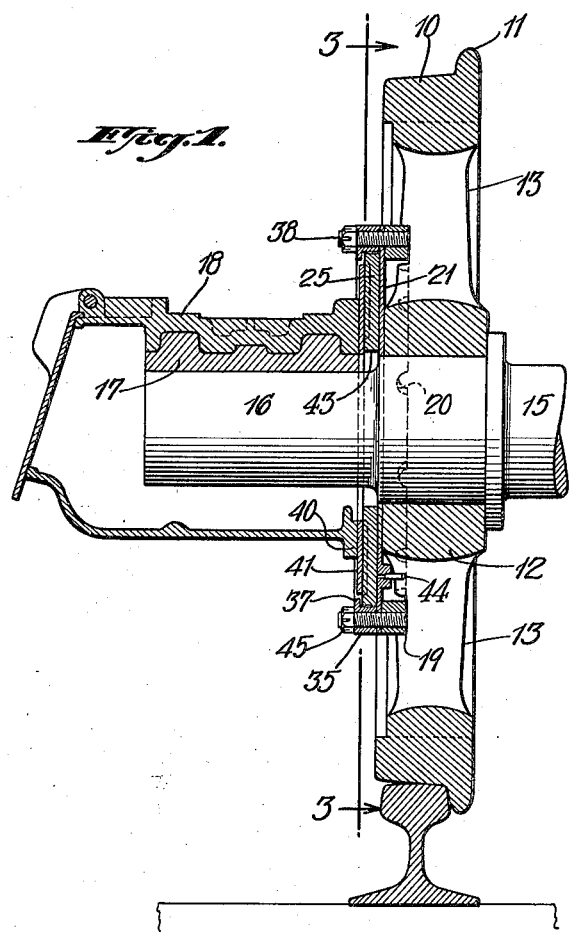
INVENTORS
JOHN P. KIVLEN.
GEORGE E. STROHL.
BY
ATTORNEYS

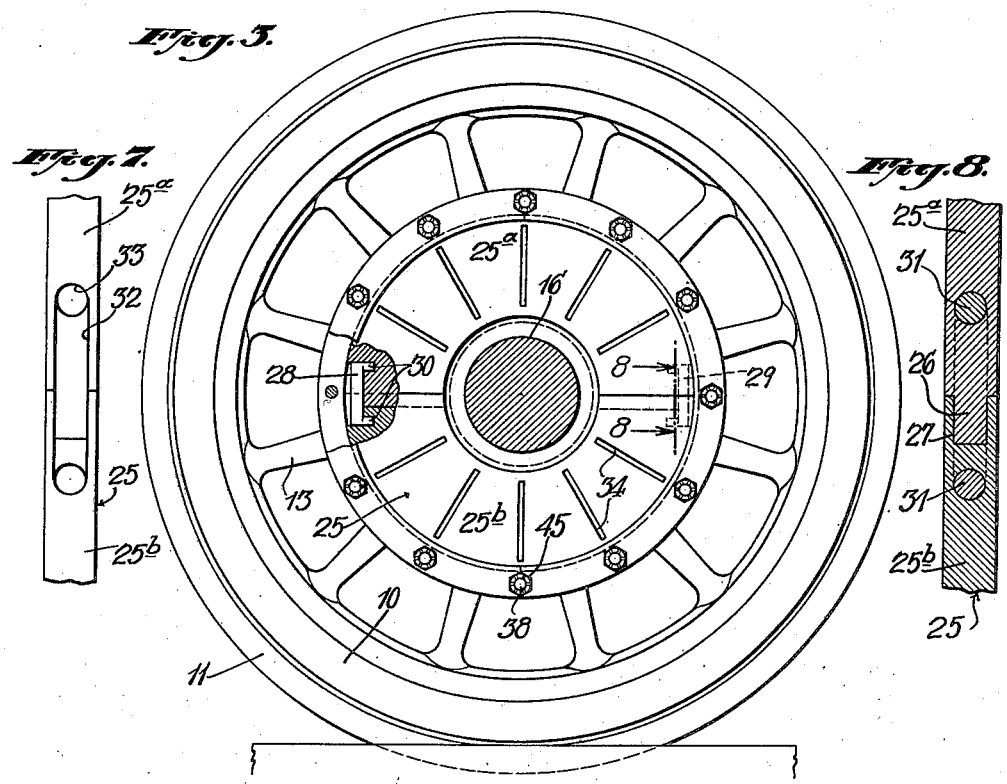

Patented July 26, 1938

2,125,028

UNITED STATES PATENT OFFICE 2,125,028

FULL FLOATING HUB LINER

John P. Kivlen, Allentown, and George E. Strohl, Northampton, Pa.

Application June 12, 1936, Serial No. 84,962

9 Claims. (Cl. 308—165)

Our invention relates to improved means for taking the wear occasioned by the rotation of a wheel relatively to its bearing. In the particular embodiment of the invention illustrated, we provide a full floating hub liner of sectional form which is interposed between wearing surfaces of a locomotive drive wheel and a journal box of the locomotive.

The invention will be fully apparent from the following detailed disclosure when read in connection with the accompanying drawings and will be defined with particularity in the appended claims.

In the drawings—

Fig. 1 is a vertical longitudinal section through locomotive wheel and journal box showing one embodiment of the invention; Fig. 2 is a similar view of a portion thereof on an enlarged scale; Fig. 3 is a section taken substantially on line 3—3 of Fig. 1 with portions broken away and shown in section in the interest of clearness; Fig. 4 is a detail view showing the component parts of the full floating hub liner element; Fig. 5 is a detail view showing complementary parts of a retainer ring; Fig. 6 is a detail perspective view of a keeper for securing hub liner parts; Fig. 7 is a detail edge view of the hub liner before the keeper is inserted; Fig. 8 is a section on line 8—8 of Fig. 3.

Referring in detail to the drawings, 10 represents a locomotive wheel having the usual rim portion 11 connected to a hub 12 by a plurality of spokes 13. The wheel is secured to an axle 15, which has a journal portion 16 fitted to a journal bearing 17 secured in a conventional type of journal box 18.

A base ring 19 provided with a plurality of notches 20, which engage the spokes 13, is secured to said spokes by suitable bolts, or welding.

A hardened steel wear plate 21 has one face 22, which bears on the hub 12 of the wheel and another face 23, which bears on the adjacent face 24 of a full floating hub liner, indicated as a whole by numeral 25. This hub liner is formed in two sections 25ª and 25ᵇ, the former having tongues 26 adapted to engage grooves 27 formed in the latter. This element may, therefore, be termed a sectional hub liner having a tongue and groove connection. The two sections of the hub liner are adapted to be secured in assembled relationship by means of keepers 28 and 29, provided with prongs 30 and 31, respectively. The liner sections are each provided with recessed seats 32 of a size to accommodate the keepers, the sections also having sockets 33 to accommodate the prongs 30 and 31. The opposite faces of the hub liner sections are provided with lubricant retaining grooves 34, the grooves on one face being staggered with relation to those on the other, as indicated in Fig. 4, by the full and dotted lines.

The hub liner will usually be made of bronze and the keepers 28 and 29 will be made of steel. These keepers, in addition to holding the parts in assembled relation, also serve as thickness gauges to enable maintenance mechanics to readily determine when the liner has been worn down sufficiently to warrant change or renewal. This function is accomplished by making the thickness of the keeper a predetermined amount less the thickness of the hub liner. And, as the keeper is centered by the coaction of the projections in the sockets, it will be apparent that, when the hub liner faces wear down to such an extent that they become flush with the faces of the keeper, such condition will be readily determinable by inspection. Thus, the keeper serves as a thickness gauge by means of which wear tolerances can be readily maintained and checked from time to time.

The full floating hub liner according to our invention is positioned with freedom for rotary movement relative to the wheel by means of a sectional retainer ring, shown in Fig. 5 and indicated as a whole by numeral 35 comprising half sections 35ª and 35ᵇ. These sections are formed with a counter-bore 36, so as to provide the annular shoulder 37.

The hub liner sections have a working fit with the surfaces defined by the annular shoulder 37 and counter-bore, thus the hub liner may be said to have a full floating support. The retaining ring 35 is secured to the base ring by means of a plurality of bolts 38, which pass through openings 39 therein and through registering openings formed in wear plate 21.

Interposed between the inner wall 40 of the journal box and the outer face of the hub liner, there is a hardened steel wear plate 41. This plate may be either separately formed and secured by screws to the wall of the journal box, or may be welded integrally therewith, if desired. Similarly, if desired, the wear plate 21 may be formed integrally with the locomotive or car wheel, as may also the base ring 19. If desired, the hub liner may be located at the inner side of the wheel in those cases where the journal box is located inwardly from the wheel.

The central opening 42 of the wear plate 41 as well as the central opening 43 of the hub liner are of materially greater diameter than that of the portion of the axle which passes therethrough. Hence, there is no opportunity for either the liner or the wear plate to contact with and wear grooves in the axle.

In normal operation of the device, the wear occasioned by thrust of a wheel in the direction of the journal box will be taken principally by the full floating sectional hub liner, this being preferably made by material, such as bronze, or similar material adapted to effectively cooperate with carbonized steel wear plates 21 and 41. The bearing faces between the wear plates and the hub liner may be lubricated.

The space between the wear plate 41 and the hub liner receives lubricant through pipes or passages in the journal box. The opposite face of the hub liner may receive lubricant injected through fittings 44 secured to the wear plate 21. The edge of the hub liner is lubricated through fittings attached to opening 46, as shown in Figs. 2 and 5. Or, grease cups could be substituted for such fittings, if desired. When the bearing faces of the hub liner have worn down to such an extent that renewal is necessary, the nuts 45, secured to the ends of bolts 38, may be removed from one of the half sections of the retainer ring. The other half section can be left in place. And the full floating hub liner can be turned to such position that the keeper comes into position for inspection by workmen. Thus, if the thickness of the hub liner substantially coincides with the thickness of the keeper, this fact will indicate that the amount of wear to be tolerated has been reached. Then, first one keeper can be removed with an outward motion, then the hub liner turned to permit the other keeper to be removed. This will free one section of the worn hub liner. Similarly, the other section may be turned to permit removal. Thereupon, new sections can be inserted and held in assembled relationship by either the old keepers or new keepers. Upon such renewal, the removed section of the retainer ring can be replaced. This whole operation can hence be readily accomplished without removing the wheels or axles from the locomotive or without any extensive dismantling of the locomotive. This effects important economies in railway maintenance, due to the speed with which the change is made.

While we have described quite specifically the particular embodiment of the invention herein illustrated it is to be understood that various changes and modifications may be made by those skilled in the art without departure from the invention as defined in the appended claims.

What we claim is:

1. In a device of the character described in combination with a wheel and journal box, a full floating hub liner comprising a plurality of sections detachably secured to one another, a wear plate secured to the wheel and engaging one face of the hub liner, a second wear plate engaging the opposite face of the hub liner and secured to the journal box, and means carried by the wheel supporting the hub liner with freedom for rotation relatively to the wheel, said means confining the exterior of the liner and being effective to prevent it from falling to the track in the event that the said sections become accidentally disconnected.

2. In a device of the character described, the combination of a journal box, a wheel, a full floating hub liner comprising separate sections having tongue and groove connections at their contacting edges, removable keepers bridging said tongue and groove connections and normally preventing separation of said sections, a sectional retainer ring having a counter-bored portion in which the hub liner is mounted with a working fit and having a shoulder portion overlapping one face of the liner, the wheel carrying means to which the retaining ring is detachably secured.

3. In a device of the character described, the combination of a wheel, a journal box, a hub liner comprising separate sections detachably secured to one another, a base ring secured to the wheel, at a point spaced radially from the hub, and a retainer ring secured to the base ring and having an annular groove forming a bearing portion in which the hub liner is mounted with freedom for rotation relatively to the wheel, said retainer ring enclosing the exterior of the hub liner and being effective to prevent it from falling to the track in the event that said sections become accidentally disconnected.

4. In a device of the character described, the combination with a wheel and journal box, of a hub liner between them comprising separate sections each having recessed portions formed in the peripheral edges thereof with keepers therein detachably uniting the sections and an annular bearing ring formed in separately removable sections on the wheel for supporting said liner with freedom for rotation relatively thereto, said keepers being of less thickness than said liner and adapted to serve as a thickness gauge, and one of said bearing ring sections being adapted to be temporarily removed to expose said keepers to view.

5. In a device of the character described, the combination with a wheel and journal box, of a floating hub liner between them comprising separable sections normally held in assembled relation by a removable keeper whose thickness is less than that of said sections, and a shouldered retaining ring secured to the wheel and supporting the liner on the wheel with freedom for rotation relatively to the wheel, said retaining ring enclosing the exterior of the hub liner and being effective to prevent it from falling to the track in the event that said sections become accidentally disconnected.

6. In a device of the character described, the combination with a wheel and journal box, of a floating hub liner between them comprising separable sections normally held in assembled relation by a removable keeper seated in a recess in the face of the liner, a sectional retaining ring detachably secured to the wheel and having a counter-bored portion making a working fit with the periphery of the hub liner and having an annular shoulder overlapping the outer face of the liner, said retaining ring enclosing the exterior of the hub liner and being effective to prevent it from falling to the track in the event that said sections become accidentally disconnected.

7. In a device of the character described, the combination with a spaced wheel and journal box of a hub liner between them comprising separable sections normally held in assembled relation by a removable keeper having prongs which engage sockets formed in the peripheral edges of said sections and a sectional retaining ring secured to the spokes of the wheel and having a counter-bored portion making a working fit with the periphery of the hub liner and having an annular shoulder overlapping the outer face of the liner, said retaining ring enclosing the exterior of the hub liner and being effective to prevent it from falling to the track in the event that said sections become accidentally disconnected.

8. A hub liner of the character described adapted to be interposed between rotary and non-rotary elements comprising separate sections jointly forming a ring-like plate, the peripheral edge of each section being recessed adjacent its end and keepers seated in the recesses for detachably securing the sections to one another, said keepers being of a predetermined thickness less than that of said liner and adapted to serve as a gauge to indicate when the liner has become worn to an extent requiring renewal.

9. A hub liner of the character described adapted to be interposed between rotary and non-rotary elements comprising a pair of separate sections jointly forming a ring-like plate, the peripheral edge of each section adjacent its end being recessed, and having a socket in the bottom of said recessed portion, and keepers wholly accommodated in said recessed portions having prongs for engagement with said sockets so as to detachably secure the sections to one another, said keepers being of a predetermined thickness less than that of said liner and adapted to serve as a gauge to indicate when the liner has become worn to an extent requiring renewal.

JOHN P. KIVLEN.
GEORGE E. STROHL.